(12) United States Patent
Tsuchiya et al.

(10) Patent No.: US 12,325,172 B2
(45) Date of Patent: *Jun. 10, 2025

(54) METHOD FOR PRODUCING DELAMINATION CONTAINER AND APPARATUS FOR PRODUCING DELAMINATION CONTAINER

(71) Applicant: NISSEI ASB MACHINE CO., LTD., Nagano (JP)

(72) Inventors: Yoichi Tsuchiya, Nagano (JP); Hiroshi Horigome, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/763,847

(22) PCT Filed: Sep. 25, 2020

(86) PCT No.: PCT/JP2020/036251
§ 371 (c)(1),
(2) Date: Mar. 25, 2022

(87) PCT Pub. No.: WO2021/060459
PCT Pub. Date: Apr. 1, 2021

(65) Prior Publication Data
US 2022/0339842 A1    Oct. 27, 2022

(30) Foreign Application Priority Data

Sep. 26, 2019  (JP) ................................ 2019-175844
Feb. 21, 2020  (JP) ................................ 2020-028040

(51) Int. Cl.
*B29C 49/06*    (2006.01)
*B29C 49/00*    (2006.01)
(Continued)

(52) U.S. Cl.
CPC ............ *B29C 49/06* (2013.01); *B29C 49/071* (2022.05); *B29C 49/22* (2013.01); *B29C 49/28* (2013.01);
(Continued)

(58) Field of Classification Search
CPC .... B29C 2949/0715; B29C 2949/3034; B29C 2949/3094; B29C 2949/0725; B29C 2049/4881
See application file for complete search history.

(56) References Cited

U.S. PATENT DOCUMENTS 6,649,121 B1    11/2003   Hamamot et al.
2009/0174102 A1*  7/2009   Iwahashi ................ B65D 47/18
                                                264/40.1
(Continued)

FOREIGN PATENT DOCUMENTS

CN     105899435 A  *  8/2016  ......... B29C 49/4273
CN     106414026 A     2/2017
(Continued)

OTHER PUBLICATIONS

International Search Report issued in International Patent Application No. PCT/JP2020/036251, dated Nov. 10, 2020, along with an English translation thereof.
(Continued)

*Primary Examiner* — Francisco W Tschen
*Assistant Examiner* — Timothy G Hemingway
(74) *Attorney, Agent, or Firm* — Greenblum & Bernstein, P.L.C.

(57) ABSTRACT

A manufacturing method includes an injection molding process of injection-molding a preform having a two-layer structure including an outer layer preform and an inner layer preform, and a blow molding process of blow molding the preform to mold a delamination container made of resin. The
(Continued)

injection molding process includes an outer layer molding process of filling an outer layer injection mold with PET (outer layer resin material) to mold the outer layer preform and molding a thin film portion in a part of the outer layer preform, and an inner layer molding process of injecting PP (inner layer resin material) toward the thin film portion to break the thin film portion and filling an inner layer injection mold with PP having a temperature lower than a melting point of PET via the broken thin film portion to mold the inner layer preform.

11 Claims, 11 Drawing Sheets

(51) Int. Cl.
*B29C 49/22* (2006.01)
*B29C 49/28* (2006.01)
*B29K 23/00* (2006.01)
*B29K 67/00* (2006.01)
*B29L 31/00* (2006.01)

(52) U.S. Cl.
CPC .............. *B29C 2949/3034* (2022.05); *B29C 2949/3094* (2022.05); *B29K 2023/12* (2013.01); *B29K 2067/003* (2013.01); *B29L 2031/7158* (2013.01)

(56) References Cited

U.S. PATENT DOCUMENTS

| | | |
|---|---|---|
| 2010/0200586 A1 | 8/2010 | Furusaw |
| 2011/0012293 A1* | 1/2011 | Manera .................. B29C 45/27 |
| | | 425/522 |
| 2017/0129158 A1 | 5/2017 | Miyazawa et al. |
| 2019/0308362 A1 | 10/2019 | Miyazawa et al. |
| 2019/0337218 A1 | 11/2019 | Kawamura et al. |
| 2022/0143897 A1 | 5/2022 | Kawamura et al. |

FOREIGN PATENT DOCUMENTS

| | | | |
|---|---|---|---|
| CN | 110225811 A | 9/2019 | |
| EP | 0729819 | 9/1996 | |
| EP | 1356915 | 11/2011 | |
| JP | S 63-239011 A | 10/1988 | |
| JP | 2000-351151 A | 12/2000 | |
| JP | 2001105478 A * | 4/2001 | ......... B29C 37/0085 |
| JP | 5267901 B2 | 8/2013 | |

OTHER PUBLICATIONS

Written Opinion of the International Searching Authority issued in International Application No. PCT/JP2020/036251, dated Nov. 10, 2020, along with an English translation thereof.
Office Action issued Mar. 22, 2023 in Chinese family member application No. 202080074363.3 and English language translation thereof.
Extended European Search Report issued in Corresponding EP Patent Application No. 20870424.7, dated Feb. 5, 2024.

* cited by examiner

METHOD FOR PRODUCING DELAMINATION CONTAINER AND APPARATUS FOR PRODUCING DELAMINATION CONTAINER

TECHNICAL FIELD

The present invention relates to a manufacturing method for manufacturing a delamination container and a manufacturing apparatus for manufacturing a delamination container. The present invention also relates to a manufacturing method for manufacturing a preform, and a delamination container.

BACKGROUND ART

In related art, there is a delamination container having a double structure including an inner layer and an outer layer, in which the inner layer delaminates from the outer layer in accordance with discharge of a content. In recent years, such a delamination container is called a delamination bottle or an airless bottle, and is used as a container for a liquid seasoning such as soy sauce, and cosmetic water of cosmetics.

At present, in manufacturing of such a delamination container, an extrusion blow method is generally used, and a use of a stretch blow method is small (see Patent Literature 1). For example, if the delamination container can be manufactured using a one-stage type (hot parison type) blow molding method in which an injection molding process to a blow molding process are continuously performed, it is possible to expect an improvement in an appearance, an improvement in a dimensional accuracy, and an improvement in a physical property strength of the delamination container, and in addition, it is possible to reduce an environmental load due to a reduction in an amount of useless materials.

CITATION LIST

Patent Literature

Patent Literature 1: Japanese Patent No. 5267901

SUMMARY OF INVENTION

Technical Problem

However, in a delamination container, a melting point of an outer layer resin material is often set to be higher than a melting point of an inner layer resin material. Therefore, in the injection molding process of molding a preform having a two-layer structure, when the outer layer resin material having a high temperature is filled after the inner layer is molded, a surface of the inner layer in contact with the resin material is melted and thermally deformed. For this reason, it is not possible to manufacture the delamination container by using the one-stage type (hot parison type) blow molding method in which the injection molding process to the blow molding process are continuously performed.

Accordingly, an object of the present invention is to provide a manufacturing method for manufacturing a delamination container using a hot parison type blow molding method, a manufacturing method for manufacturing a preform, a manufacturing apparatus, and a delamination container.

Solution to Problem

In order to achieve the above object, according to one aspect of the present invention, there is provided a manufacturing method for manufacturing a delamination container, the manufacturing method including:
 an injection molding process of injection-molding a preform having a two-layer structure including an outer layer and an inner layer; and
 a blow molding process of blow molding the preform to mold the delamination container made of a resin,
 in which the injection molding process includes:
  an outer layer molding process of molding the outer layer by filling a first injection mold with an outer layer resin material and molding a thin film portion on a part of the outer layer, and
  an inner layer molding process of injecting an inner layer resin material toward the thin film portion to break the thin film portion, and filling a second injection mold with the inner layer resin material having a temperature lower than a melting point of the outer layer resin material via the broken thin film portion to mold the inner layer.

According to the above method, the inner layer molding process is performed after the outer layer having the thin film portion is formed in the outer layer molding process. In the inner layer molding process, the thin film portion is broken by injection pressure of the inner layer resin material, and the second injection mold is filled with the inner layer resin material having a temperature lower than the melting point of the outer layer resin material via the broken thin film portion. At this time, since the inner layer resin material is filled at a temperature lower than the melting point of the outer layer resin material, the outer layer is less likely to be thermally deformed even if the outer layer comes into contact with a high-temperature inner layer resin material in a molten state. After the preform having the two-layer structure is molded in this manner, the preform having the two-layer structure is blow molded in the blow molding process, so that the delamination container made of resin is molded.

As described above, according to the above method, it is possible to provide a manufacturing method for manufacturing the delamination container by using a hot parison type blow molding method.

According to one aspect of the present invention, there is provided a method for manufacturing a preform having a two-layer structure including an outer layer and an inner layer by injection molding, the manufacturing method including:
 an outer layer molding process of molding the outer layer by filling a first injection mold with an outer layer resin material, and molding a thin film portion on a part of the outer layer, and
 an inner layer molding process of injecting an inner layer resin material toward the thin film portion to break the thin film portion, and filling a second injection mold with the inner layer resin material having a temperature lower than a melting point of the outer layer resin material via the broken thin film portion to mold the inner layer.

According to the above method, the inner layer molding process is performed after the outer layer having the thin film portion is formed in the outer layer molding process. In the inner layer molding process, the thin film portion is broken by injection pressure of the inner layer resin material, and the second injection mold is filled with the inner layer resin material having a temperature lower than the melting point of the outer layer resin material via the broken thin film portion. At this time, since the inner layer resin material is filled at a temperature lower than the melting point of the outer layer resin material, the outer layer is less likely to be thermally deformed even if the outer layer comes into contact with a high-temperature inner layer resin material in a molten state. In this way, the preform having a two-layer structure can be manufactured.

According to one aspect of the present invention, there is provided a manufacturing apparatus for manufacturing a delamination container, the manufacturing apparatus including:

an injection molding part configured to injection-mold a preform having a two-layer structure including an outer layer and an inner layer; and a blow molding part configured to blow mold the preform to mold a delamination container made of a resin, in which the injection molding part includes:

a first injection mold configured to mold an outer layer resin material supplied from a hot runner mold into the outer layer and form a thin film portion on a part of the outer layer in conjunction with a valve pin of the hot runner mold; and a second injection mold configured to mold an inner layer resin material, filled by breaking the thin film portion, into the inner layer.

According to one aspect of the present invention, there is provided a delamination container having a two-layer structure including an outer layer and an inner layer, in which a part of the inner layer is exposed to an outside of the outer layer through a filling port formed in the outer layer.

Advantageous Effects of Invention

According to the present invention, it is possible to provide a manufacturing method for manufacturing a delamination container using a hot parison type blow molding method, a manufacturing method for a preform, a manufacturing apparatus, and the delamination container.

DESCRIPTION OF EMBODIMENTS

Figure 1:
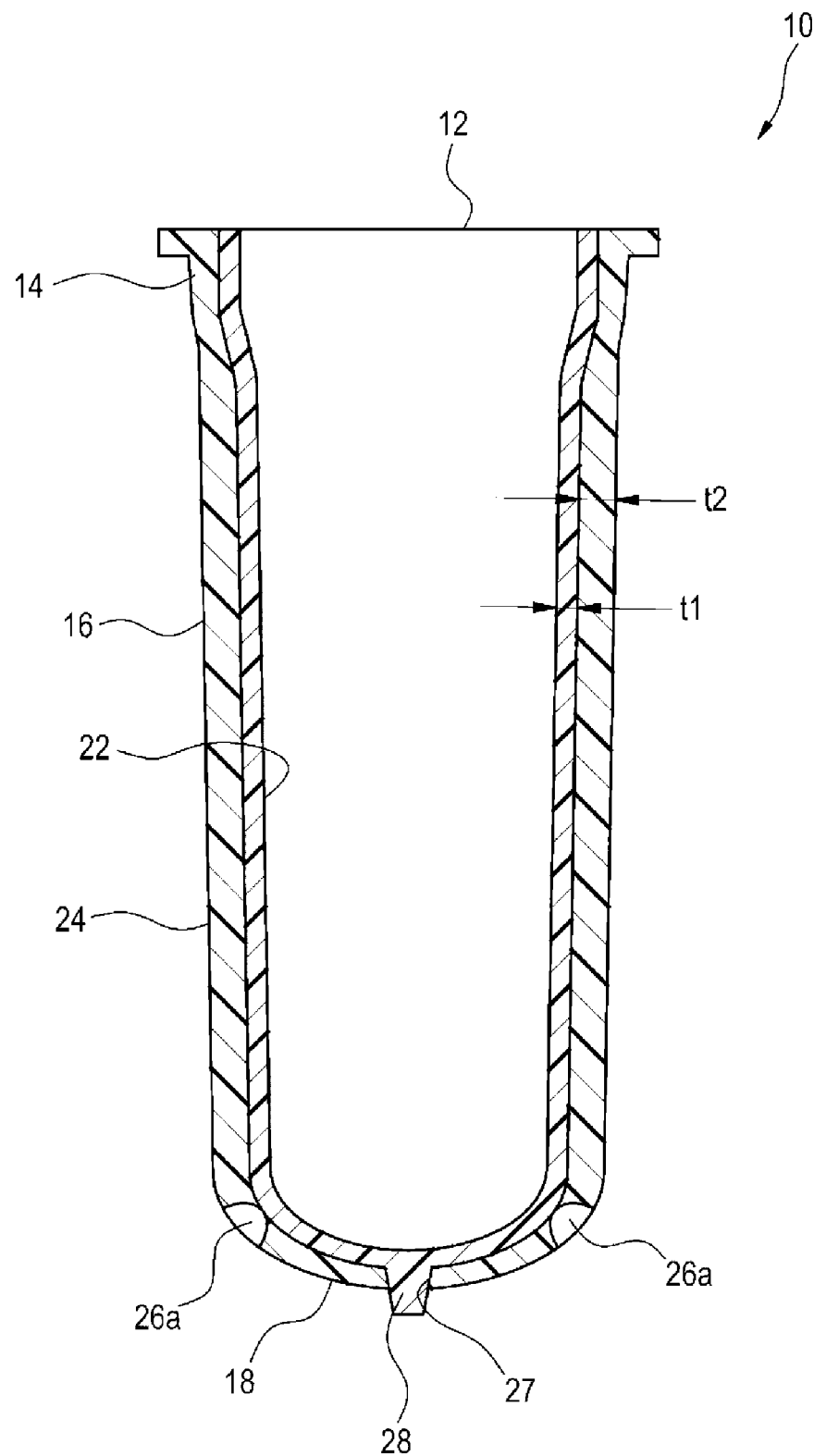
FIG. 1 is a cross-sectional view showing an example of a preform having a double structure.

Hereinafter, an embodiment of the present invention will be described with reference to the drawings. Dimensions of members shown in the drawings may be different from actual dimensions thereof for convenience of description.

First, a preform 10 for molding a delamination container according to an embodiment will be described with reference to FIG. 1. FIG. 1 is a cross-sectional view of the preform 10. The preform 10 includes an opening portion 12, a neck portion 14 connected to the opening portion 12, a body portion 16 connected to the neck portion 14, and a bottom portion 18 connected to the body portion 16.

The preform 10 is a resin molded product configured in a tubular shape. The preform 10 is a resin molded product having a two-layer structure including an inner layer 22 and an outer layer 24. A ratio of a thickness t2 of the outer layer 24 to a thickness t1 of the inner layer 22 in the body portion 16 is 1.5 or more. The ratio of the thicknesses is preferably 3.0 or less from a viewpoint of transparency of the delamination container to be molded.

The inner layer 22 is made of a synthetic resin (a synthetic resin excellent in moisture barrier properties, gas barrier properties, heat resistance, chemical resistance, and the like) having properties capable of stably storing a stored material and preventing deterioration (oxidation), and is made of, for example, polypropylene (PP). The outer layer 24 is made of a synthetic resin having excellent moldability and transparency, for example, polyethylene terephthalate (PET). A melting point of PP is about 160 to 170° C. A melting point of PET is higher than the melting point of PP and is about 245 to 260° C.

A recess 26a for an air introduction hole is formed in the preform 10. Here, the recess for the air introduction hole formed in the preform described in the present specification is used as a term including both a mode formed as a penetrating hole and a mode recessed without penetrating. The recess 26a for the air introduction hole is formed in the bottom portion 18. Here, a position where the recess 26a for the air introduction hole is formed is not limited to the bottom portion 18. The recess 26a for the air introduction hole is a recess or a hole having a columnar shape or a prismatic shape, and at least two recesses or holes are formed along a circumferential direction of the preform 10. The recess 26a for the air introduction hole may be formed so as to function as an air introduction hole for introducing air for delaminating the outer layer and the inner layer of the delamination container molded from the preform 10 by breaking a part (a thin film region or the like) of the recess 26a at the time of stretch blow molding in a subsequent process. A filling port (opening portion) 27 is formed in a central portion of the bottom portion 18 so as to penetrate the outer layer 24. The filling port 27 is filled in a state where a part 28 of the inner layer 22 is exposed to the outside of the outer layer 24 so as to close the filling port 27. A position of the recess 26a for the air introduction hole is formed at a position farther from the center of the bottom portion 18 than the position of the filling port 27. Here, the recess 26a may be formed in a penetrating hole shape at the time of an injection molding process (outer layer molding process) to be described later.

Figure 2:
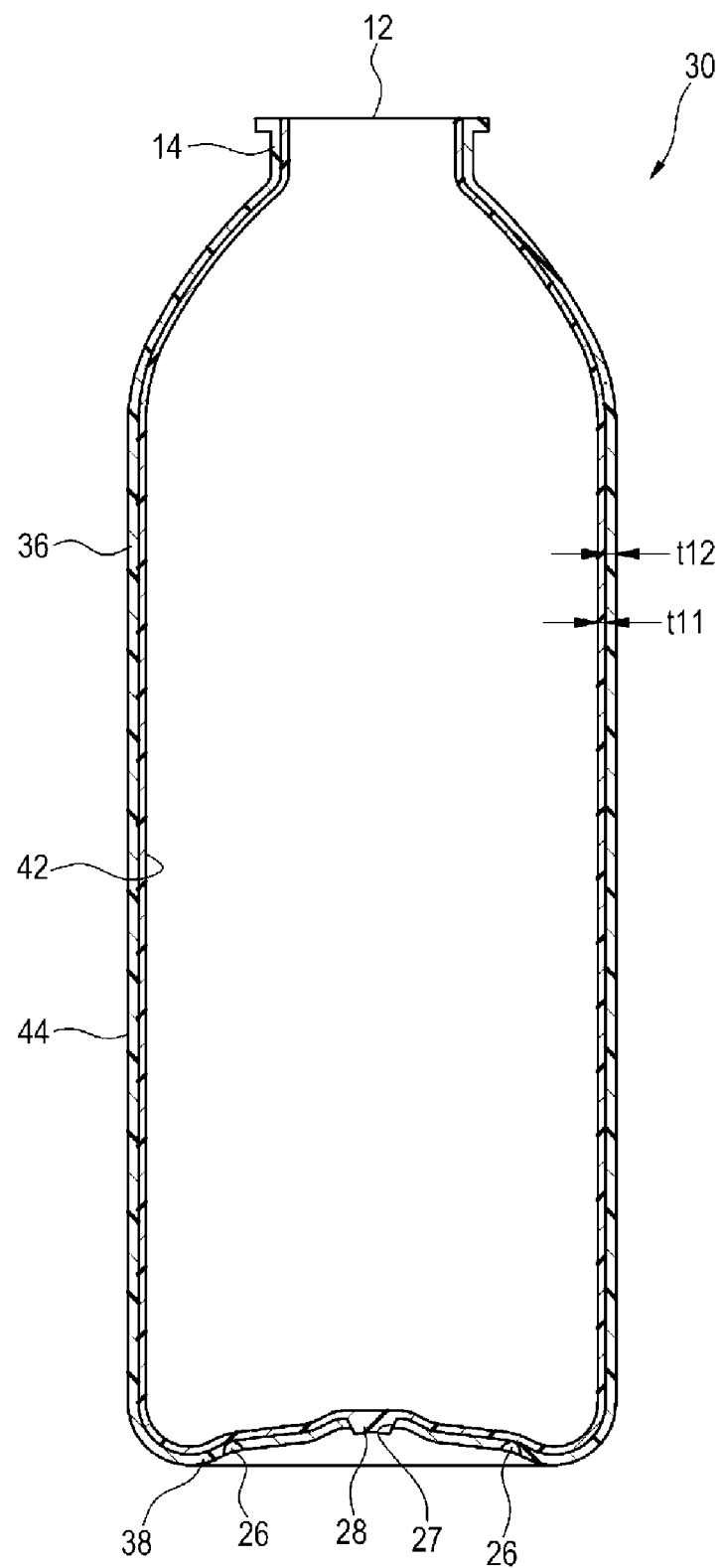
FIG. 2 is a cross-sectional view showing a delamination container according to an embodiment of the present invention.

Next, the delamination container (two-layer container) 30 according to the embodiment will be described with reference to FIG. 2. FIG. 2 is a cross-sectional view of the delamination container 30. The delamination container 30 is a bottle-shaped resin container obtained by blow molding the preform 10. The delamination container 30 includes the opening portion 12, the neck portion 14 connected to the opening portion 12, a body portion 36 connected to the neck portion 14, and a bottom portion 38 connected to the body portion 36. The body portion 16 and the bottom portion 18 of the preform 10 are expanded by stretch blow, so that the body portion 36 and the bottom portion 38 of the delamination container 30 are molded. At the time of the stretch blow, a part (thin film region or the like) of the recess 26a of the preform 10 may be broken, and an air introduction hole 26 may be formed in the delamination container 30. Here, in the injection molding process (the outer layer molding process and an inner layer molding process) to be described later, the recess 26a may be formed in the penetrating hole shape to form the air introduction hole 26.

The delamination container 30 has a two-layer structure similarly to the preform 10. The delamination container 30 is a resin container having a two-layer structure including an inner layer 42 and an outer layer 44. A ratio of a thickness t12 of the outer layer 44 to a thickness t11 of the inner layer 42 in the body portion 36 is the same as the ratio of the thickness t2 of the outer layer 24 to the thickness t1 of the inner layer 22 in the body portion 16 of the preform 10.

As described above, the air introduction hole 26 is formed in the bottom portion 38 of the delamination container 30. The air introduction hole 26 is formed so as to penetrate the outer layer 44. The filling port (opening portion) 27 is formed in a central portion of the bottom portion 38 in the same manner as the preform 10. The filling port 27 is formed to penetrate the outer layer 44. The filling port 27 is provided in a state where a part 28 of the inner layer 42 is clogged so as to close the filling port 27. The part 28 of the inner layer 42 is exposed to the outside of the outer layer 44 through the filling port 27. The thickness of the part 28 of the inner layer 42 is greater than the thickness of the outer layer 44. Since the part 28 of the inner layer 42 is provided so as to be exposed to the outside from the filling port 27 of the outer layer 44, positional deviation of the inner layer with respect to the outer layer 44 is prevented.

Figure 3:
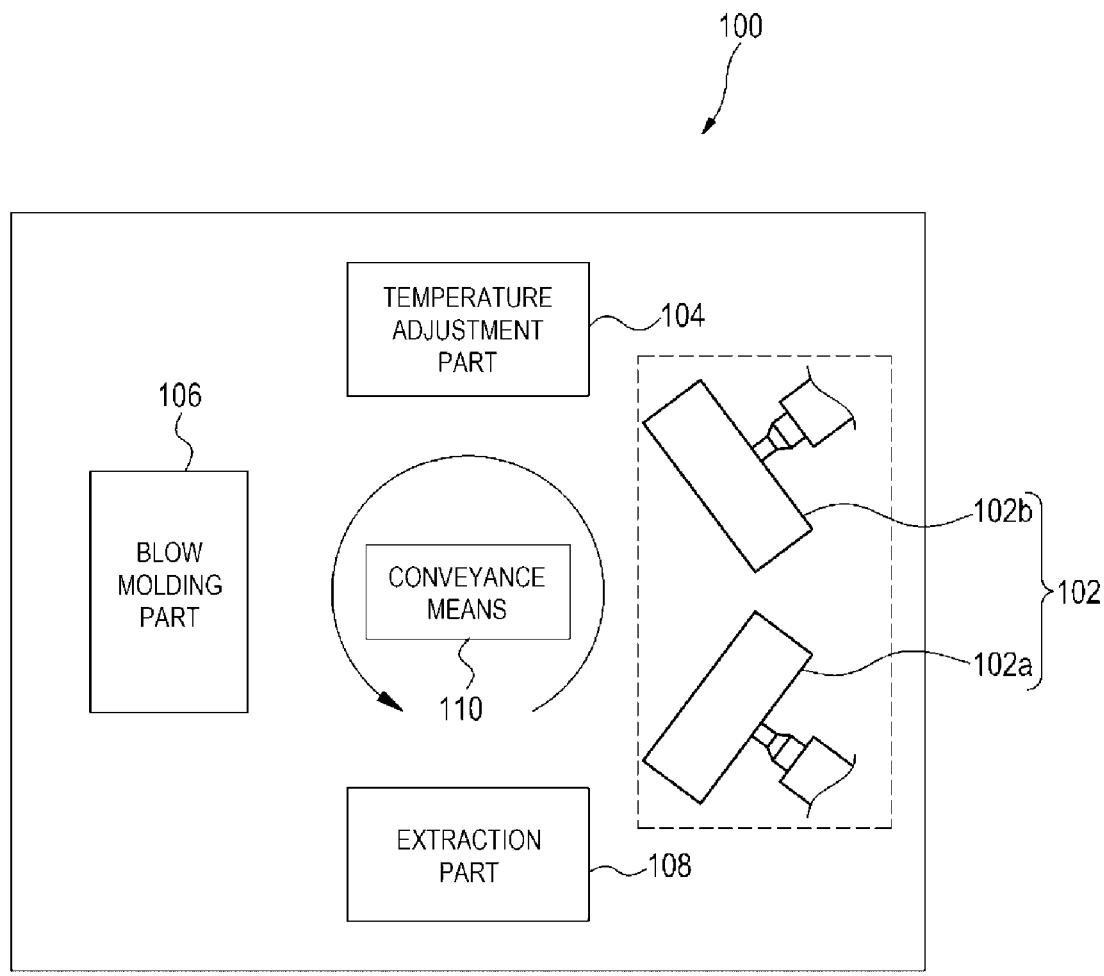
FIG. 3 is a schematic view showing a manufacturing apparatus for manufacturing the delamination container according to the embodiment of the present invention.
Figure 4:
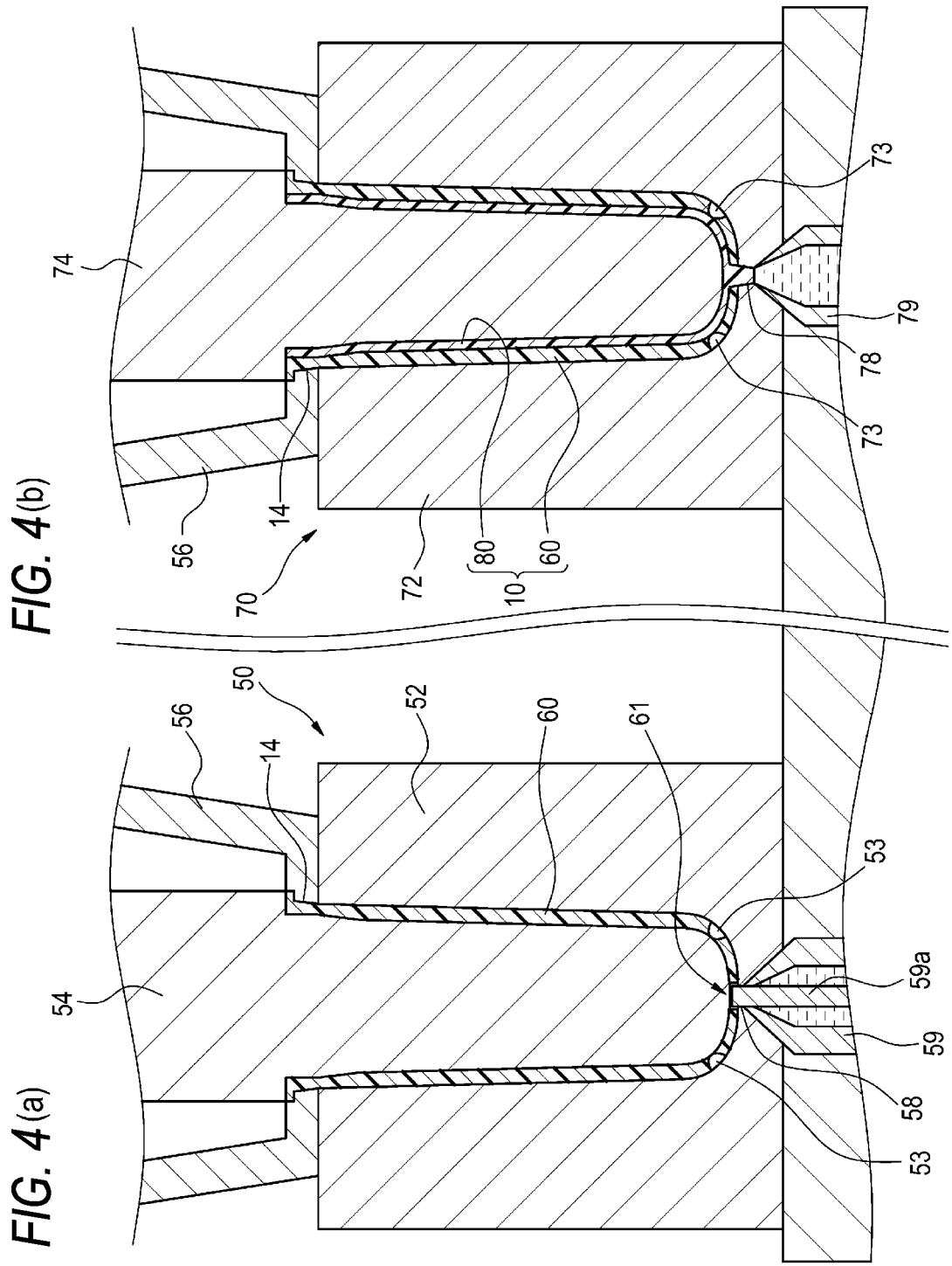
FIG. 4(a) is a cross-sectional view of an outer layer injection mold for molding an outer layer preform.
FIG. 4(b) is a cross-sectional view of an inner layer injection mold for molding an inner layer preform.

Next, a manufacturing apparatus 100 for manufacturing the delamination container 30 according to the embodiment will be described with reference to FIGS. 3 and 4. FIG. 3 is a schematic view showing the manufacturing apparatus 100 for manufacturing the delamination container 30. (a) of FIG. 4 shows an outer layer injection mold 50 (an example of a first injection mold) for molding an outer layer preform 60 including the outer layer 24 of the preform 10. (b) of FIG. 4 shows an inner layer injection mold 70 (an example of a second injection mold) that molds an inner layer preform 80 including the inner layer 22 of the preform 10.

As shown in FIG. 3, the manufacturing apparatus 100 includes an injection molding part 102 for injection-molding the preform 10, and a temperature adjustment part 104 for adjusting the temperature of the molded preform 10. The manufacturing apparatus 100 includes a blow molding part 106 for manufacturing the delamination container 30 by blowing the temperature-adjusted preform 10, and an extraction part 108 for extracting the manufactured delamination container 30. The injection molding part 102 includes a first injection molding part 102a and a second injection molding part 102b. As described above, the manufacturing apparatus 100 is preferably a five-station type hot parison type blow molding apparatus (one-step type blow molding apparatus) including at least five molding parts of the first injection molding part 102a, the second injection molding part 102b, the temperature adjustment part 104, the blow molding part 106, and the extraction part 108 in a one-stage manner. The manufacturing apparatus 100 may be a six-station type in which a molding part is further added. Examples of the additional molding part include a second temperature adjustment part provided between the first injection molding part 102a and the second injection molding part 102b, a second blow molding part provided between the blow molding part 160 and the extraction part 108, a post-treatment part of the container (a reversal part of the container), and an inspection part of the container.

The preform 10 or the delamination container 30 is conveyed by a conveyance means 110 in the manufacturing apparatus 100 in the order of the first injection molding part 102a, the second injection molding part 102b, the temperature adjustment part 104, the blow molding part 106, and the extraction part 108. The first injection molding part 102a, the second injection molding part 102b, the temperature adjustment part 104, the blow molding part 106, and the extraction part 108 are provided at positions rotated by a predetermined angle (for example, 72 degrees or 60 degrees each) around the conveyance means 110. The conveyance means 110 is constituted by a transfer plate, for example, a rotary plate. The preform 10 or the delamination container 30 is conveyed to each part in accordance with the rotation of the transfer plate or the rotary plate which is the conveyance means 110. As shown in (a) and (b) of FIG. 4, the preform 10 or the delamination container 30 may be conveyed to each part in accordance with the rotation of the rotary plate in a state where the neck portion 14 is supported by a neck mold 56 attached to the rotary plate. The manufacturing apparatus 100 is an apparatus for manufacturing the hot parison type resin container, and continuously performs manufacturing of the preform 10 and the delamination container 30.

As shown in (a) and (b) of FIG. 4, the injection molding part 102 includes the outer layer injection mold 50 that is disposed in the first injection molding part 102a and molds the outer layer preform 60, and the inner layer injection mold 70 that is disposed in the second injection molding part 102b and molds the inner layer preform 80 inside the outer layer preform 60.

The outer layer injection mold 50 (an example of the first injection mold) includes an outer layer cavity mold 52 (an example of a first injection cavity mold), an outer layer core mold 54 (an example of a first injection core mold), and a neck mold 56. The outer layer injection mold 50 is configured to form the outer layer preform 60 by pouring an outer layer resin material such as PET into a cavity formed by clamping the molds (filling (injecting) a molten resin). The outer layer resin material is supplied from a hot runner mold 59 and poured into a cavity through an outer layer gate 58.

The outer layer cavity mold 52 has a hole forming protrusion 53 (an example of a first protrusion) protruding toward the outer layer core mold 54. The hole forming protrusion 53 is a columnar shape or prismatic shape protrusion for forming the above-described recess 26a for the air introduction hole in the outer layer preform 60. At least two hole forming protrusions 53 are formed along the circumferential direction on the inner surface of the bottom portion of the outer layer cavity mold 52.

The hot runner mold 59 has a valve pin 59a movable toward the outer layer gate 58 in a flow path through which the outer layer resin material flows. The valve pin 59a is configured to move to a position close to the outer layer core mold 54 through the outer layer gate 58 after the cavity is filled with the outer layer resin material. Accordingly, a thin film portion 61 in which the thickness of the outer layer is thinner than that of a peripheral portion is formed in the central portion of the bottom portion of the outer layer preform 60.

The inner layer injection mold 70 (an example of the second injection mold) includes an inner layer cavity mold 72 (an example of a second injection cavity mold), an inner layer core mold 74 (an example of a second injection core mold), and a neck mold 56. The neck mold 56 is a common neck mold that moves to a position of the inner layer injection mold 70 while holding the outer layer preform 60 molded by the outer layer injection mold 50. A core diameter of the inner layer core mold 74 is smaller than a core diameter of the outer layer core mold 54 by the thickness of the inner layer preform 80. In addition, a size (diameter) of the recess in a top view of the inner layer cavity mold 72 and a size (diameter) of the recess in a top view of the outer layer cavity mold 52 are formed to be the same diameter. The inner layer injection mold 70 is configured to form the inner layer preform 80 inside the outer layer preform 60 molded by the outer layer injection mold 50 by pouring (filling with a molten resin) an inner layer resin material such as PP into the cavity formed by clamping the molds.

The inner layer resin material is supplied from a hot runner mold 79 and poured into the cavity via an inner layer gate 78. The inner layer resin material is poured into the cavity when the thin film portion 61 formed in the outer layer preform 60 is broken by a flow of the inner layer resin material. When the thin film portion 61 of the outer layer preform 60 is broken, the filling port 27 is formed in the bottom portion 18 of the preform 10. The inner layer resin material poured into the cavity is filled into the cavity through the filling port 27.

The inner layer cavity mold 72 has a fitting protrusion 73 (an example of a second protrusion) protruding toward the inner layer core mold 74. The fitting protrusion 73 is formed at a position corresponding to the recess 26a for the air introduction hole of the outer layer preform 60 formed by the hole forming protrusion 53 of the outer layer cavity mold 52. When the inner layer injection mold 70 is clamped, the fitting protrusions 73 are fitted into the recesses 26a for the air introduction holes of the outer layer preform 60, respectively. The inner layer injection mold 70 is filled with the inner layer resin material in a state where the fitting protrusion 73 is fitted into the recess 26a for the air introduction hole. When the fitting protrusion 73 is fitted into the recess 26a, the outer layer preform 60 is positioned in the inner layer cavity mold 72.

The temperature adjustment part 104 includes a temperature adjustment cavity mold and a temperature adjustment core mold, which are not shown. A cooling medium such as water flows inside the temperature adjustment cavity mold and the temperature adjustment core mold. The temperature adjustment part 104 is configured to sandwich the preform 10 molded by the injection molding part 102 between the temperature adjustment cavity mold and the temperature adjustment core mold to bring the preform 10 into contact with the temperature adjustment cavity mold and the temperature adjustment core mold, and to adjust the temperature of the preform 10 to a temperature suitable for blow molding. A temperature of the cooling medium flowing into the temperature adjustment cavity mold and the temperature adjustment core mold is set to, for example, about 10° C. to about 65° C. Here, the temperature adjustment part 104 may include a heating pot mold and a heating core mold that adjust the temperature of the preform 10 in a non-contact state.

The blow molding part 106 includes a blow cavity mold, a stretch rod, and a blow core mold, which are not shown. The preform 10 temperature-adjusted by the temperature adjustment part 104 is stretched by, for example, the stretch rod, and air (compressed air) is introduced from the blow core mold to inflate the preform 10 into the shape of the blow cavity mold, thereby molding the delamination container 30.

The extraction part 108 is configured such that the delamination container 30 is extracted by releasing the neck portion 14 of the delamination container 30 from the neck mold 56.

Figure 5:
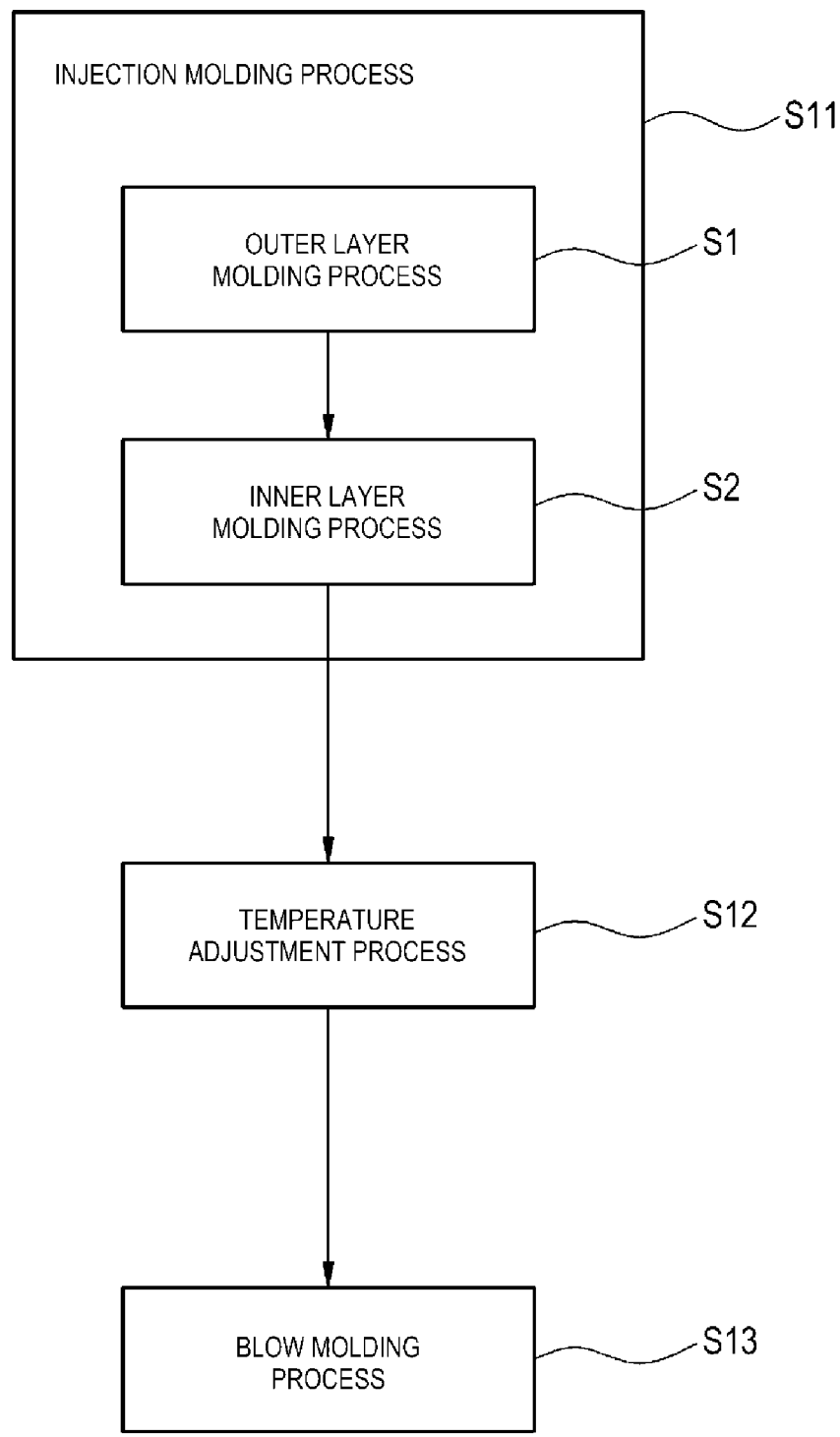
FIG. 5 is a flowchart showing a manufacturing method for manufacturing the delamination container.

Next, a manufacturing method for manufacturing the delamination container 30 according to the embodiment will be described with reference to FIGS. 5 and 4. FIG. 5 is a flowchart showing the manufacturing method for manufacturing the delamination container 30. As shown in FIG. 5, the manufacturing method for manufacturing the delamination container 30 includes an injection molding process S11 of injection-molding the preform 10, a temperature adjustment process S12 of adjusting the temperature of the preform 10, and a blow molding process S13 of blow molding the preform 10 to mold the delamination container 30.

First, the injection molding process S11 will be described. The injection molding process S11 includes an outer layer molding process S1 of molding the outer layer preform 60 and an inner layer molding process S2 of molding the inner layer preform 80.

In the outer layer molding process S1, the outer layer injection mold 50 including the outer layer cavity mold 52, the outer layer core mold 54, and the neck mold 56 is clamped, and the cavity of the clamped outer layer injection mold 50 is filled with the outer layer resin material (for example, PET) through the outer layer gate 58.

At this time, the recess 26a for forming the air introduction hole 26 in the delamination container 30 is formed in the bottom portion of the outer layer preform 60. The recess 26a for the air introduction hole is formed by the hole forming protrusion 53 provided in the outer layer cavity mold 52. The hole forming protrusion 53 is disposed such that, when the outer layer injection mold 50 is clamped, a top portion of the hole forming protrusion 53 is in contact with the outer layer core mold 54 or is in a state of being in non-contact with the outer layer core mold 54 and having a minute gap. By filling the cavity of the outer layer injection mold 50 with the outer layer resin material in this state, the recess 26a for the air introduction hole can be molded in the outer layer preform 60.

At this time, the thin film portion 61 in which the thickness of the outer layer is thinner than that of the peripheral portion is molded in the central portion of the bottom portion of the outer layer preform 60. The thin film portion 61 is molded by the valve pin 59a of the hot runner mold 59 that supplies the outer layer resin material into the cavity of the outer layer injection mold 50. After the cavity of the outer layer injection mold 50 is filled with the outer layer resin material, the valve pin 59a is moved toward the outer layer core mold 54 so that the central portion of the bottom portion of the outer layer preform 60 is recessed by a tip portion of the valve pin 59a. By cooling for a predetermined time in this state, a recessed portion becomes the thin film portion 61. The thickness of the thin film portion 61 is preferably $1/10$ or less of an average thickness of the bottom portion around the thin film portion 61.

After the filling of the cavity with the outer layer resin material is completed, the outer layer preform 60 is molded by maintaining the clamped state of the outer layer injection mold 50 for a predetermined time and then releasing the clamped state. At this time, in order to cool the outer layer resin material filled in the cavity, a cooling medium is caused to flow through circulation paths (refrigerant flow circuits) provided in the outer layer cavity mold 52 and the outer layer core mold 54. The temperature of the cooling medium is set within a range of, for example, about 5° C. to about 20° C. Accordingly, for example, when PET is used as the outer layer resin material and PP is used as the inner layer resin material, the outer layer preform 60 is cooled until a surface temperature of the outer layer preform 60 (temperature of a skin layer) becomes equal to or lower than a melting point of the inner layer resin material (PP; 160° C.).

The molded outer layer preform 60 is lifted together with the outer layer core mold 54 and the neck mold 56, and the outer layer preform 60 is demolded from the outer layer cavity mold 52. Subsequently, the outer layer core mold 54 is further lifted to demold the outer layer core mold 54 from the outer layer preform 60. Then, the outer layer preform 60 held by the neck mold 56 is moved to an upper side of the inner layer cavity mold 72 (inner layer molding process) together with the neck mold 56 by the conveyance means 110.

In the inner layer molding process S2, the outer layer preform 60 is accommodated in the inner layer injection mold 70 configured by the inner layer cavity mold 72, the inner layer core mold 74, and the neck mold 56 by clamping the neck mold 56 holding the outer layer preform 60 with respect to the inner layer cavity mold 72 and the inner layer core mold 74. Next, a cavity defined by an inner surface of the outer layer preform 60, the inner layer core mold 74, and the neck mold 56 is filled with the inner layer resin material (for example, PP) via the inner layer gate 78. The temperature of the inner layer resin material PP to be filled is set to a temperature lower than the melting point of the outer layer resin material constituting the outer layer preform 60 (for example, PET: 260° C.). In addition, the surface temperature of the outer layer preform 60 when the inner layer resin material is filled is cooled to a temperature equal to or lower than the melting point of the inner layer resin material to be filled (for example, PP: 160° C.).

When the cavity of the inner layer injection mold 70 is filled with the inner layer resin material, first, the inner layer resin material is injected toward the thin film portion 61 of the outer layer preform 60. The inner layer resin material is injected to the thin film portion 61 to break the thin film portion 61 by injection pressure, and the cavity of the inner layer injection mold 70 is filled with the inner layer resin material through the broken thin film portion 61.

Further, when the inner layer resin material is filled into the cavity of the inner layer injection mold 70, the inner layer resin material is filled in a state in which the fitting protrusion 73 provided in the inner layer cavity mold 72 is fitted into the recess 26a for the air introduction hole formed in the bottom portion of the outer layer preform 60. Since the fitting protrusion 73 and the recess 26a for the air introduction hole are provided at positions corresponding to each other, the fitting projection 73 and the recess 26a for the air introduction hole are fitted to each other by clamping the neck mold 56 holding the outer layer preform 60 with respect to the inner layer cavity mold 72 and the inner layer core mold 74.

After the filling of the cavity with the inner layer resin material is completed, the preform 10 including the inner layer preform 80 and the outer layer preform 60 is molded by maintaining the clamped state of the inner layer injection mold 70 for a predetermined time and then releasing the clamped state. At this time, in order to cool the inner layer resin material filled in the cavity and the outer layer preform 60 in the inner layer injection mold 70, the cooling medium may flow through the circulation paths (refrigerant flow circuits) provided in the inner layer cavity mold 72 and the inner layer core mold 74. The temperature of the cooling medium is set within a range of, for example, about 5° C. to about 20° C.

The molded preform 10 is lifted together with the inner layer core mold 74 and the neck mold 56, and the preform 10 is demolded from the inner layer cavity mold 72. Subsequently, the inner layer core mold 74 is further lifted to demold the inner layer core mold 74 from the preform 10. Then, the preform 10 held by the neck mold 56 is rotated together with the neck mold 56 by the conveyance means 110, and is moved to the temperature adjustment part 104 (temperature adjustment process).

Next, the temperature adjustment process S12 will be described. The temperature adjustment process S12 is a process of adjusting the temperature of the injection-molded preform 10 to a temperature range suitable for blow molding. In the temperature adjustment process S12, first, the preform 10 moved to the temperature adjustment part 104 is accommodated in the temperature adjustment cavity mold (not shown) by lowering the neck mold 56. Subsequently, the temperature adjustment core mold (not shown) is lowered to bring the temperature adjustment core mold into contact with the inner surface of the preform 10. By sandwiching the preform 10 between the temperature adjustment cavity mold and the temperature adjustment core mold, the temperature of the preform 10 is adjusted to a temperature suitable for blow molding. After the temperature adjustment, the temperature adjustment core mold is lifted to demold the preform 10 from the temperature adjustment core mold. Subsequently, the neck mold 56 is lifted to demold the preform 10 from the temperature adjustment cavity mold. Then, the preform 10 held by the neck mold 56 is rotated together with the neck mold 56 by the conveyance means 110, and is moved to the blow molding part 106 (blow molding process). In the temperature adjustment process S12, a heating pot mold and a heating core mold that adjust the temperature of the preform 10 in a non-contact state may be used.

Next, the blow molding process S13 will be described. In the blow molding process S13, the preform 10 is accommodated in a blow cavity mold (not shown). While the preform 10 is stretched by a stretch rod (not shown), blow air is introduced from a blow core mold (not shown) to inflate the preform 10 into the shape of a blow cavity mold, thereby molding the delamination container 30. At the time of the stretch blow, a part (for example, a bottom portion) of the recess 26a for the air introduction hole is broken, and the air introduction hole 26 is formed in the delamination container 30. Thereafter, the delamination container 30 is released from the mold of the blow molding part 106, and the delamination container 30 is moved to the extraction part 108. Here, in the injection molding process S11 (the outer layer molding process S1 and the inner layer molding process S2), the recess 26a may be formed in a penetrating hole shape to form the air introduction hole 26.

In the manufacturing of a delamination container of an inner and outer two-layer type, an extrusion blow method is generally used at present, and a stretch blow method is not frequently used. If the delamination container can be manufactured by the stretch blow method, it is possible to expect an improvement in the appearance of the delamination container, an improvement in the dimensional accuracy, and an improvement in the physical property strength, and in addition, it is possible to achieve a reduction in the environmental load due to a reduction in a loss material.

As a manufacturing method for manufacturing the delamination container by the stretch blow method that is put into practical use at present, for example, there is a hot parison type blow molding method in which either one of an inner layer preform and an outer layer preform is used as an insert material. However, in the case of the present molding method, in addition to a blow molding machine, an injection molding machine for manufacturing a preform piece having a two-layer structure in advance is required, and a manufacturing cost and a manufacturing process increase.

In addition, in the delamination container, the melting point of the outer layer resin material is often set to be higher than the melting point of the inner layer resin material. Therefore, in the injection molding process of molding the preform having the two-layer structure, for example, when the inner layer preform is molded first and then the outer layer preform is molded, a surface of the inner layer preform in contact with a high-temperature outer layer resin material is melted and thermally deformed when the resin material for the outer layer is filled.

Therefore, previously, it was not possible to manufacture a delamination container using a single-stage hot parison type blow molding method in which the injection molding process to the blow molding process are continuously performed.

On the other hand, according to the manufacturing method for manufacturing the delamination container including the above-described processes, in the injection molding process S11 of the preform 10, the outer layer preform 60 having the thin film portion 61 is first molded in the outer layer molding process S1, and then the inner layer preform 80 is molded inside the outer layer preform 60 in the inner layer molding process S2. In the inner layer molding process S2, the thin film portion 61 is broken by the injection pressure of PP (inner layer resin material), and the inner layer injection mold 70 is filled with PP through the broken thin film portion 61. At this time, the PP to be filled in the inner layer injection mold 70 is filled at a temperature lower than the melting point (260° C.) of the PET (outer layer resin material) forming the outer layer preform 60. Therefore, when the outer layer preform 60 is filled with PP, even if the molten high-temperature PP comes into contact with the already molded outer layer preform 60, the outer layer preform 60 is less likely to be thermally deformed.

According to the manufacturing method for manufacturing the delamination container, after the surface temperature of the outer layer preform 60 becomes equal to or lower than the melting point of PP in the outer layer molding process S1, the outer layer molding process S1 proceeds to the inner layer molding process S2, and the inner layer injection mold 70 is filled with PR Therefore, even when the filled PP comes into contact with the outer layer preform 60 accommodated in the inner layer injection mold 70, the PP is less likely to be thermally deformed.

According to the manufacturing method for manufacturing the delamination container, in the outer layer molding process S1, after the outer layer cavity mold 52 is filled with PET from the hot runner mold 59, the valve pin 59a of the hot runner mold 59 is moved toward the filled PET, and a part of the filled PET is recessed by the tip portion of the valve pin 59a, whereby the thin film portion 61 is formed. Therefore, the thin film portion 61 can be formed on the bottom portion of the outer layer preform 60 by using the valve pin 59a of the valve of the hot runner mold 59 without providing a dedicated mechanism for molding the thin film portion 61.

According to the manufacturing method for manufacturing the delamination container, in the outer layer molding process S1, the recess 26a for the air introduction hole is molded in the outer layer preform 60 by the hole forming protrusion 53 provided in the outer layer cavity mold 52. The air introduction hole 26 for delaminating the outer layer and the inner layer of the delamination container 30 at the time of blow molding can be formed based on the recess 26a.

According to the manufacturing method for manufacturing the delamination container, in the inner layer molding process S2, the inner layer cavity mold 72 is filled with PP in a state where the fitting protrusion 73 provided in the inner layer cavity mold 72 is fitted into the recess 26a for the air introduction hole formed in the outer layer preform 60. For this reason, for example, even if the bottom portion of the recess 26a for the air introduction hole is broken, it is possible to prevent the PP from filling the air introduction hole 26 of the outer layer preform 60 when the PP is filled. Furthermore, since the outer layer preform 60 is positioned in the inner layer cavity mold 72, a cavity (molding space) for the inner layer preform can be formed with high dimensional accuracy.

Then, according to the manufacturing method for manufacturing the delamination container, after the preform 10 having the two-layer structure is molded as described above, the delamination container 30 made of resin is molded by blow molding the preform 10 having the two-layer structure in the blow molding process S13.

Therefore, according to the above-described manufacturing method for manufacturing the delamination container, the delamination container 30 can be manufactured using the hot parison type blow molding method.

The manufacturing apparatus 100 for manufacturing the delamination container having the above-described configuration is a four-station type in which the temperature adjustment part 104 is provided between the injection molding part 102 and the blow molding part 106, and the injection molding part 102 includes the outer layer injection mold 50 for injection-molding the outer layer preform 60 and the inner layer injection mold 70 for injection-molding the inner layer preform 80. The outer layer injection mold 50 can mold the PET supplied from the hot runner mold 59 into the outer layer preform 60, and can form the thin film portion 61 at the bottom portion of the outer layer preform 60 in conjunction with the valve pin 59a of the hot runner mold 59. In addition, the inner layer injection mold 70 can break the thin film portion 61 of the outer layer preform 60 and mold the PP filled in the inner layer injection mold 70 into the inner layer preform 80. At this time, the PP to be filled in the inner layer injection mold 70 is filled at a temperature lower than the melting point (260° C.) of the PET forming the outer layer preform 60. Therefore, when the outer layer preform 60 is filled with PP, even if the molten high-temperature PP comes into contact with the already molded outer layer preform 60, the outer layer preform 60 is less likely to be thermally deformed. Therefore, according to the manufacturing apparatus 100 for manufacturing the delamination container, the delamination container 30 can be manufactured using a single-stage hot parison type blow molding method in which the injection molding process to the blow molding process are continuously performed.

Figure 6:
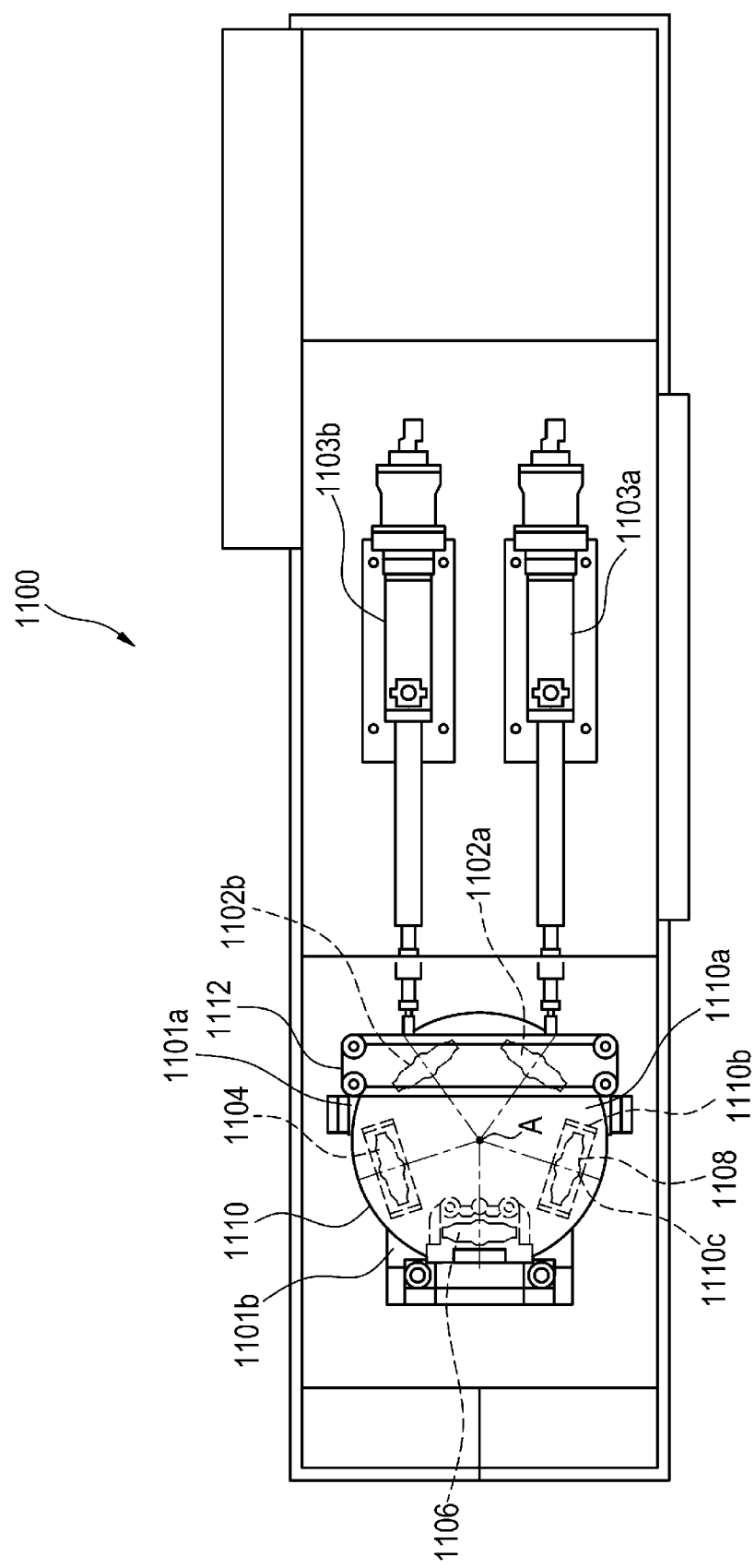
FIG. 6 is a plan view of a manufacturing apparatus according to a first aspect.
Figure 7:
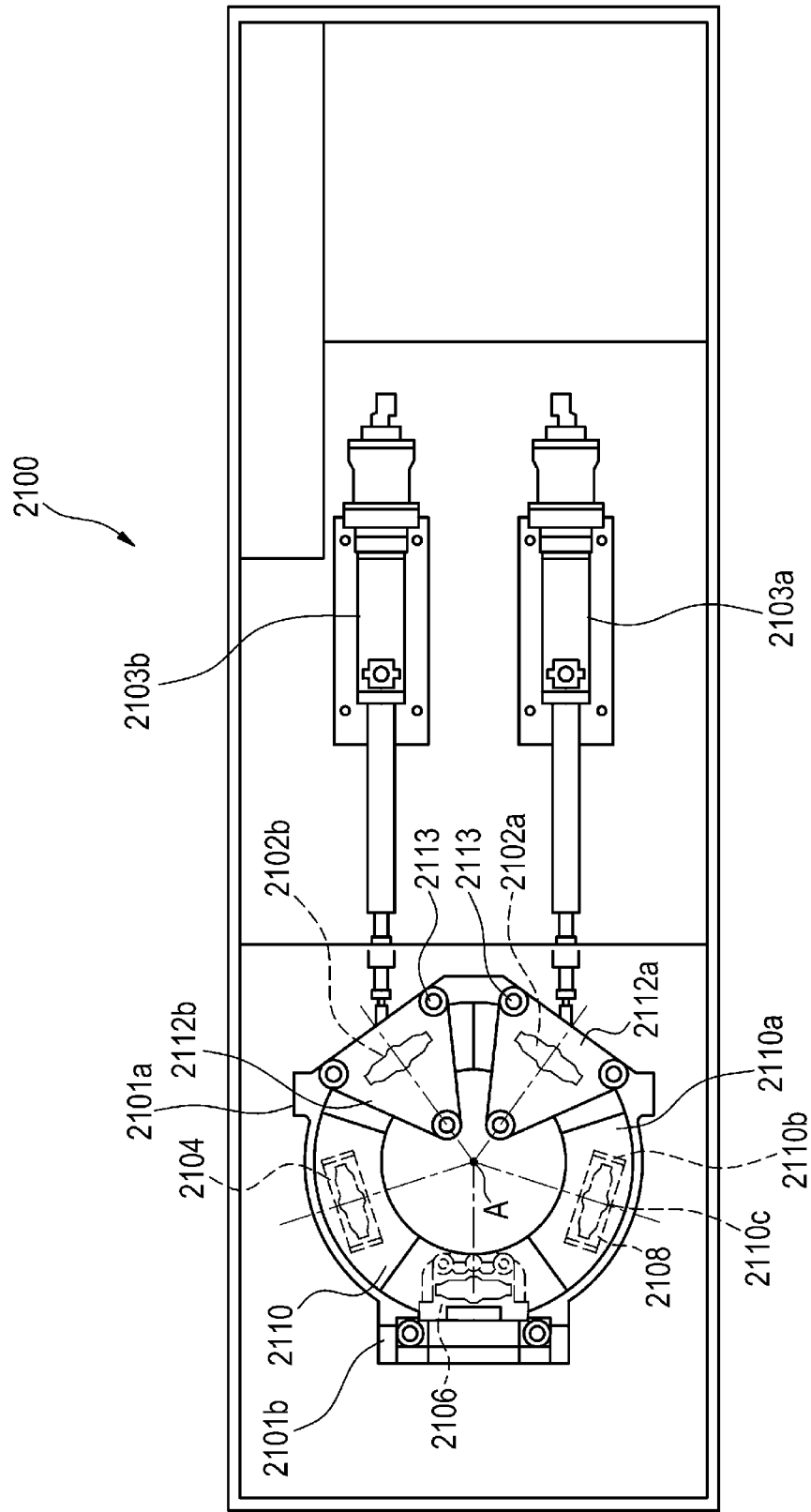
FIG. 7 is a plan view of a manufacturing apparatus according to a second aspect.
Figure 8:
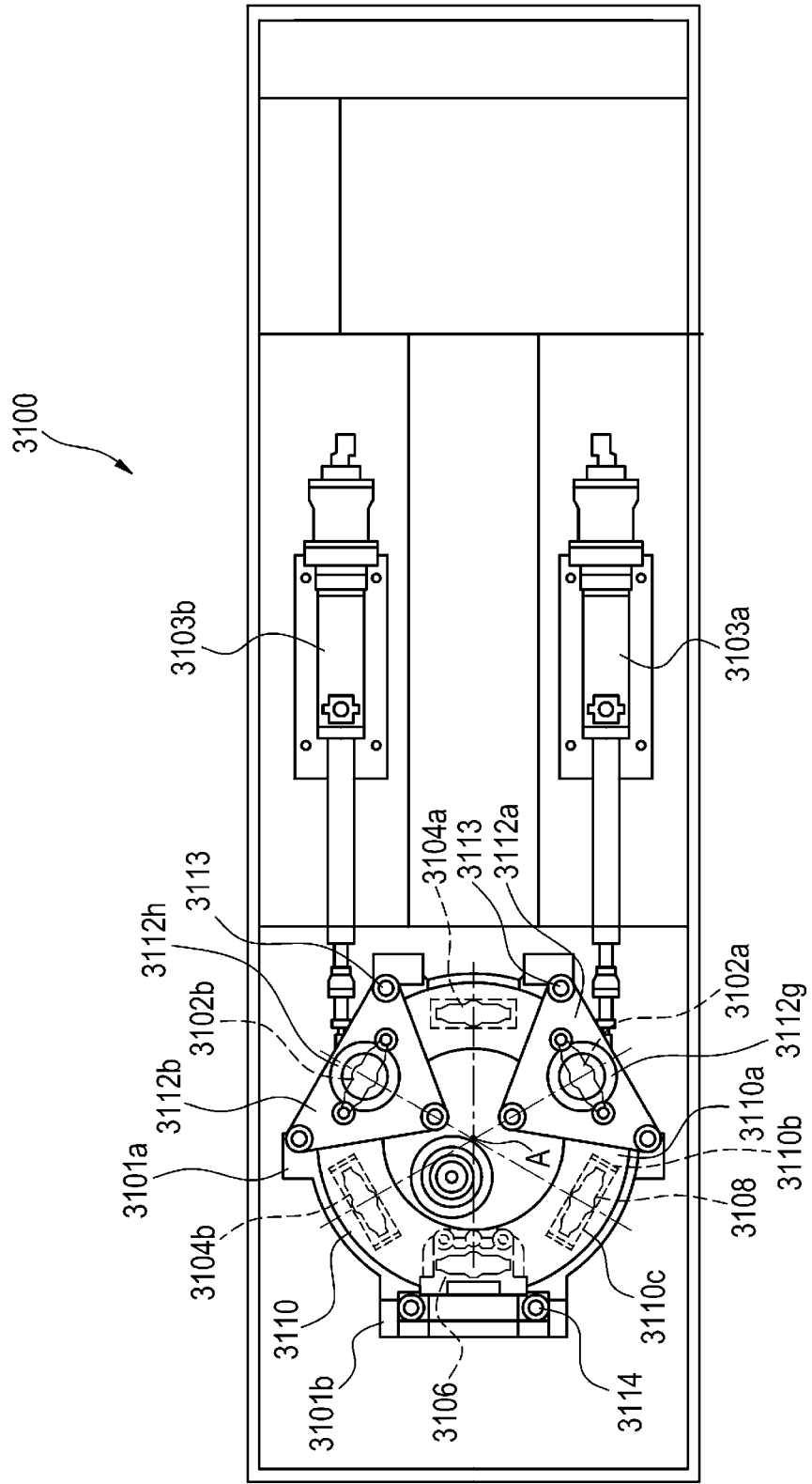
FIG. 8 is a plan view of a manufacturing apparatus according to a third aspect.
Figure 9:
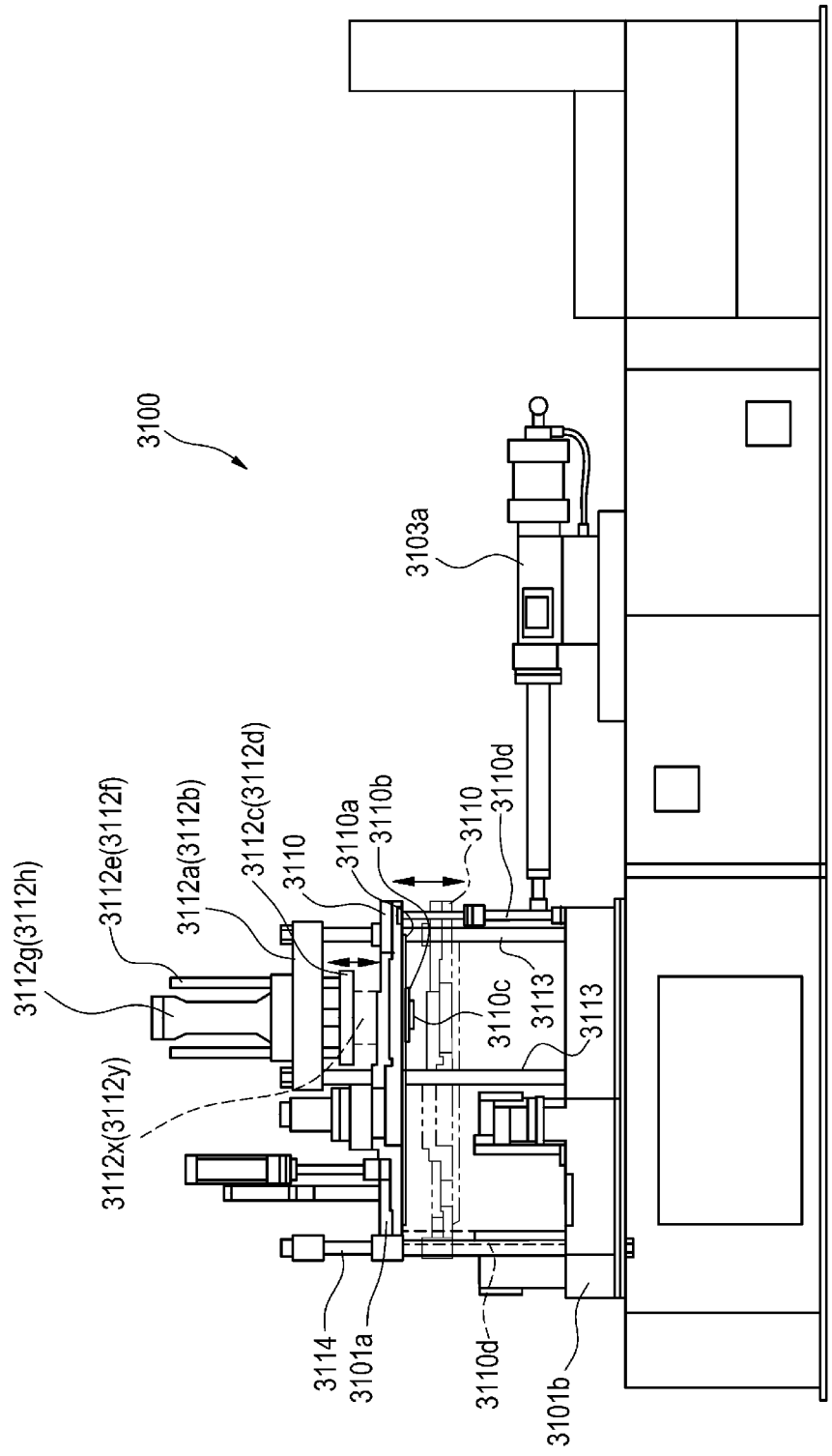
FIG. 9 is a side view of the manufacturing apparatus according to the third aspect.

Here, manufacturing apparatuses according to other aspects different from the above-described embodiment will be described with reference to FIGS. 6 to 11. FIG. 6 is a plan view of a manufacturing apparatus 1100 according to a first aspect. FIG. 7 is a plan view of a manufacturing apparatus 2100 according to a second aspect. FIG. 8 is a plan view of a manufacturing apparatus 3100 according to a third aspect. FIG. 9 is a side view of a manufacturing apparatus 3100 according to a third aspect. These other aspects are examples of specific modes of the manufacturing apparatus capable of performing the manufacturing method according to the above-described embodiment. For convenience of explanation, dimensions of members shown in the drawings may be different from actual dimensions of the members, and a plurality of members (neck mold or the like) having the same shape may be partially omitted.

First, the manufacturing apparatus 1100 according to the first aspect will be described with reference to FIG. 6. The manufacturing apparatus 1100 includes five molding stations of a first injection molding part 1102*a*, a second injection molding part 1102*b*, a temperature adjustment part 1104, a blow molding part 1106, and an extraction part 1108 in this order in the circumferential direction. The manufacturing apparatus 1100 includes conveyance means 1110 including a transfer plate 1110*a* configured to be rotatable about a central axis A and a neck mold support part 1110*b* configured to support and guide a neck (lip) mold 1110*c* configured to be capable of holding a resin molded product (preform, container). The transfer plate 1100*a* is a single flat plate member (rotary plate) having a substantially disc shape. Each station is disposed at a position equally divided into five in the circumferential direction around the central axis A of the conveyance means 1110. The conveyance means 1110 is configured to be capable of intermittently rotating by 72 degrees to sequentially transport the resin molded product held by the neck mold 1110*c* to each station. Five sets of neck molds 1110*c* are provided corresponding to the number of five stations. Five sets of neck molds 1110*c* are disposed on a lower surface of the transfer plate 1100*a* corresponding to positions equally divided into five in the circumferential direction around the central axis A of the transfer plate 1100*a*. The manufacturing apparatus 1100 includes an upper base 1101*a* that supports the conveyance means 1110 and a lower base (machine base) 1101*b* located below the upper base 1101*a*. The manufacturing apparatus 1100 further includes conveyance means (lifting and lowering means) (not shown) for lifting and lowering the upper base 1101*a*. The conveyance means 1110 is configured to be capable of simultaneously lifting and lowering the resin molded product held by the neck mold 1110*c* in each station through a lifting and lowering operation of the upper base 1101*a*.

The first injection molding part 1102*a* includes a first resin injection device 1103*a*. A first injection molding mold (a first injection core mold, a first injection cavity mold, and a neck mold) is connected to the first injection molding part 1102*a*. The first injection molding part 1102*a* molds a first preform by injecting resin from the first resin injection device 1103*a* into a space (cavity) formed by clamping the first injection molding mold. The second injection molding part 1102*b* includes a second resin injection device 1103*b*. A second injection molding mold (the second injection core mold, the second injection cavity mold, and the neck mold) is connected to the second injection molding part 1102*b*. The second injection molding part 1102*b* molds a second preform by injecting resin from the second resin injection device 1103*b* into a space formed by conveying the first preform and clamping the second injection molding mold, and molds a preform including the first preform and the second preform. The first injection cavity mold and the second injection cavity mold are connected to the lower base (machine base) 110 1*b*.

The first injection molding part 1102*a* and the second injection molding part 1102*b* are provided with an integral mold clamping plate 1112 that simultaneously operates over the two stations. The first injection core mold and the second injection core mold are connected to the integral mold clamping plate 1112. The first injection core mold and the second injection core mold operate simultaneously in accordance with the lifting and lowering operation of the integral mold clamping plate 1112.

The temperature adjustment part 1104, the blow molding part 1106, and the extraction part 1108 of the manufacturing apparatus 1100 may have a same form as the temperature adjustment part 104, the blow molding part 106, and the extraction part 108 of the manufacturing apparatus 100 according to the above-described embodiment. Here, a detailed description is omitted.

The manufacturing apparatus 1100 includes the conveyance means 1110 including the transfer plate 1110*a* that integrally operates and the integral mold clamping plate 1112, and can mold the preform and the container including the first preform and the second preform with a small number of members, and can significantly reduce the cost as a manufacturing apparatus including five stations. In the manufacturing apparatus 1100, it is preferable to lower the temperature of a first preform in the first injection molding part 1102*a* to a temperature suitable for injection molding in the second injection molding part 1102*b*.

Next, the manufacturing apparatus 2100 according to the second aspect will be described with reference to FIG. 7. The manufacturing apparatus 2100 includes five molding stations of a first injection molding part 2102*a*, a second injection molding part 2102*b*, a temperature adjustment part 2104, a blow molding part 2106, and an extraction part 2108 in this order in the circumferential direction. The manufacturing apparatus 2100 includes conveyance means 2110 including a transfer plate 2110*a* configured to be rotatable about a central axis A and a neck mold support part 2110*b* configured to support and guide a neck (lip) mold 2110*c*. The transfer plate 2110*a* is a substantially fan-shaped flat plate member (division-type rotary plate) obtained by dividing a disk into five parts, and is independently provided for each molding station. Each station is disposed at a position equally divided into five in the circumferential direction around the central axis A of the conveyance means 2110. The conveyance means 2110 is configured to be capable of intermittently rotating by 72 degrees to sequentially transport the resin molded product held by the neck mold 2110*c* to each station. Five sets of neck molds 2110*c* are provided corresponding to the number of five stations. Five sets of neck molds 2110*c* are disposed on the lower surfaces of the five substantially fan-shaped transfer plates, respectively. The conveyance means 2110 is configured to independently lift and lower the resin molded product held in the neck mold in each station. The manufacturing apparatus 2100 includes an upper base 2101*a* that supports the conveyance means 2110 and a lower base (machine base) 2101*b* located below the upper base 2101*a*. The manufacturing apparatus 2100 further includes a conveyance means (lifting and lowering means) (not shown) for independently lifting and lowering the transfer plates 2110*a* located in the first injection molding part 2102*a*, the second injection molding part 2102*b*, and the blow molding part 2106. Therefore, for example, the conveyance means 2110 can first lower the neck mold in the first injection molding part 2102a and then lower the neck mold in the second injection molding part 2102b.

The first injection molding part 2102a includes a first resin injection device 2103a. A first injection molding mold (a first injection core mold, a first injection cavity mold, and a neck mold) is connected to the first injection molding part 2102a. The second injection molding part 2102b includes a second resin injection device 2103b. A second injection molding mold (the second injection core mold, the second injection cavity mold, and the neck mold) is connected to the second injection molding part 2102b. The first injection molding part 2102a and the second injection molding part 2102b may have the same form as the first injection molding part 1102a and the second injection molding part 1102b according to the first aspect described above. Here, a detailed description is omitted. The first injection cavity mold and the second injection cavity mold are connected to the lower base (machine base) 2101b.

The first injection molding part 2102a and the second injection molding part 2102b are respectively provided with a first mold clamping plate 2112a and a second mold clamping plate 2112b which are independently operable. Each of the first mold clamping plate 2112a and the second mold clamping plate 2112b is configured to be movable up and down while being guided by at least three tie bars 2113. A first injection core mold and a second injection core mold are connected to the first mold clamping plate 2112a and the second mold clamping plate 2112b, respectively. The first injection core mold and the second injection core mold operate independently of each other in accordance with the respective lifting and lowering operations of the first mold clamping plate 2112a and the second mold clamping plate 2112b.

The temperature adjustment part 2104, the blow molding part 2106, and the extraction part 2108 of the manufacturing apparatus 2100 may have the same form as the temperature adjustment part 104, the blow molding part 106, and the extraction part 108 of the manufacturing apparatus 100 according to the above-described embodiment. Here, a detailed description is omitted.

The manufacturing apparatus 2100 includes the conveyance means 2110 configured to independently lift and lower the resin molded product held by the neck mold 2110c in each station, and the first mold clamping plate 2112a and the second mold clamping plate 2112b which are independent of each other, and can increase a degree of freedom of the mold clamping operation related to the neck mold 2110c and the injection core mold, and can increase the degree of freedom of molding the preform including the first preform and the second preform and the container. Since the number of the temperature adjustment parts is one, the cost can be reduced. Also in the manufacturing apparatus 2100, it is preferable to lower the temperature of the first preform in the first injection molding part 2102a to a temperature suitable for injection molding in the second injection molding part 2102b.

Next, the manufacturing apparatus 3100 according to the third aspect will be described with reference to FIGS. 8 and 9. The manufacturing apparatus 3100 includes six stations of a first injection molding part 3102a, a first temperature adjustment part 3104a, a second injection molding part 3102b, a second temperature adjustment part 3104b, a blow molding part 3106, and an extraction part 3108 in this order in the circumferential direction. In FIG. 9, details of each station are omitted. The manufacturing apparatus 3100 includes conveyance means 3110 including a transfer plate 3110a configured to be rotatable about a central axis A and a neck mold support part 3110b configured to support and guide a neck (lip) mold 3110c. The transfer plate 3110a is a single flat plate member (rotary plate) having a substantially disc shape. Each station is disposed at a position equally divided into six in the circumferential direction around the central axis A of the conveyance means 3110. The conveyance means 3110 is configured to be capable of intermittently rotating by 60 degrees to sequentially transport the resin molded product held by the neck mold 3110c to each station. The manufacturing apparatus 3100 includes an upper base 3101a that supports the conveyance means 3110 and a lower base (machine base) 3101b located below the upper base 3101a. The manufacturing apparatus 3100 includes at least two (for example, four) conveyance means (lifting and lowering means) 3110d such as a hydraulic or pneumatic cylinder for lifting and lowering the upper base 3101a. Six sets of neck molds 3110c are provided corresponding to the number of six stations. Six sets of neck molds 3110c are disposed on the lower surface of the transfer plate 3110a corresponding to positions equally divided into six in the circumferential direction around the central axis A of the transfer plate 3110a. The conveyance means 3110 is configured to be capable of simultaneously lifting and lowering the resin molded product held by the neck mold 3110c in each station. The conveyance means 3110 is lifted and lowered while being guided by tie bars 3113 on the side of the first injection molding part 3102a and the second injection molding part 3102b and tie bars 3114 on the side of the blow molding part 3106.

The first injection molding part 3102a includes a first resin injection device 3103a. A first injection molding mold (a first injection core mold, a first injection cavity mold, and a neck mold) is connected to the first injection molding part 3102a. The second injection molding part 3102b includes a second resin injection device 3103b. A second injection molding mold (the second injection core mold, the second injection cavity mold, and the neck mold) is connected to the second injection molding part 3102b. The first injection molding part 3102a and the second injection molding part 3102b further include a first mold clamping plate 3112a and a second mold clamping plate 3112b which are independently operable. At least three tie bars 3113 are provided on each of the first mold clamping plate 3112a and the second mold clamping plate 3112b. The first mold clamping plate 3112a and the second mold clamping plate 3112b can also have the same form as the first mold clamping plate 2112a and the second mold clamping plate 2112b according to the second aspect described above. The first mold clamping plate 3112a and the second mold clamping plate 3112b are respectively provided with a first injection core mold movable plate 3112c and a second injection core mold movable plate 3112d to which the first injection core mold and the second injection core mold are respectively connected. The first injection core mold movable plate 3112c and the second injection core mold movable plate 3112d are guided by a first guide rod 3112e and a first guide rod 3112f with respect to the first mold clamping plate 3112a and the second mold clamping plate 3112b, respectively, and independently perform the lifting and lowering operation. The first injection cavity mold and the second injection cavity mold are connected to the lower base (machine base) 3101b. In the manufacturing apparatus 3100 shown in FIG. 9, the first mold clamping plate 3112a and the second mold clamping plate 3112b may be fixed without moving up and down, and the first injection core mold movable plate 3112c and the second injection core mold movable plate 3112d to which a first injection core mold 3112x and a second injection core mold 3112*y* are respectively connected may be moved up and down by, for example, a first injection mold clamping cylinder (first injection mold clamping mechanism) 3112*g* and a second injection mold clamping cylinder (second injection mold clamping mechanism) 3112*h* provided above the upper base 3101*a* to clamp the injection molding mold.

The first temperature adjustment part 3104*a* is an intermediate temperature adjustment station provided between the two injection molding stations (the first injection molding part 3102*a* and the second injection molding part 3102*b*). The first temperature adjustment part 3104*a* includes a first temperature adjustment cavity mold (not shown) and a first temperature adjustment core mold (not shown). A cooling medium such as water flows inside the first temperature adjustment cavity mold and the first temperature adjustment core mold. The first temperature adjustment part 3104*a* is configured to sandwich the first preform molded by the first injection molding part 3102*a* between the first temperature adjustment cavity mold and the first temperature adjustment core mold, and to adjust the temperature of the first preform to a temperature suitable for injection molding by the second injection molding part 3102*b*. A temperature of the cooling medium flowing into the first temperature adjustment cavity mold and the first temperature adjustment core mold is set to, for example, about 10° C. to about 65° C. The first temperature adjustment part 3104*a* adjusts the temperature of the first preform by cooling and/or heating the first preform. The first temperature adjustment part 3104*a* is not limited to the above, and may be implemented by a combination pattern of a heating pot and a heating core, an upper heating pot and a lower temperature adjustment pot and a temperature adjustment core, and may take other modes.

The second temperature adjustment part 3104*b*, the blow molding part 3106, and the extraction part 3108 of the manufacturing apparatus 3100 may have the same form as the temperature adjustment part 104, the blow molding part 106, and the extraction part 108 of the manufacturing apparatus 100 according to the above-described embodiment. Here, a detailed description is omitted.

The manufacturing apparatus 3100 includes the conveyance means 3110 provided with the transfer plate 3110*a* that integrally operates and the first mold clamping plate 3112*a* and the second mold clamping plate 3112*b* that are independent of each other, and can reduce the cost as compared with the case of adopting the mechanism (conveyance means) capable of independently lifting and lowering the neck mold 3110*c*, and can increase the degree of freedom of the mold clamping operation related to an injection core mold, and can increase the degree of freedom of molding of the preform and the container including the first preform and the second preform. Since the manufacturing apparatus 3100 includes the first temperature adjustment part 3104*a* that is the intermediate temperature adjustment station, the temperature of the first preform can be appropriately adjusted even when the mold clamping operation is simplified.

Since the manufacturing apparatus 3100 includes the first temperature adjustment part 3104*a*, the first preform molded in the first injection molding part 3102*a* can be demolded from the mold in a short time, and the first preform in a high-temperature state can be cooled by the first temperature adjustment part 3104*a*. In this case, a cooling time of the first preform in the first injection molding part 3102*a* can be significantly shortened, and manufacturing efficiency can be significantly improved. In addition, in the case of forming the delamination container, a lubricant can be applied to the first preform by the first temperature adjustment part 3104*a*, and the degree of freedom of molding can be increased. Surface coloring (surface decoration) is also possible.

Figure 10:
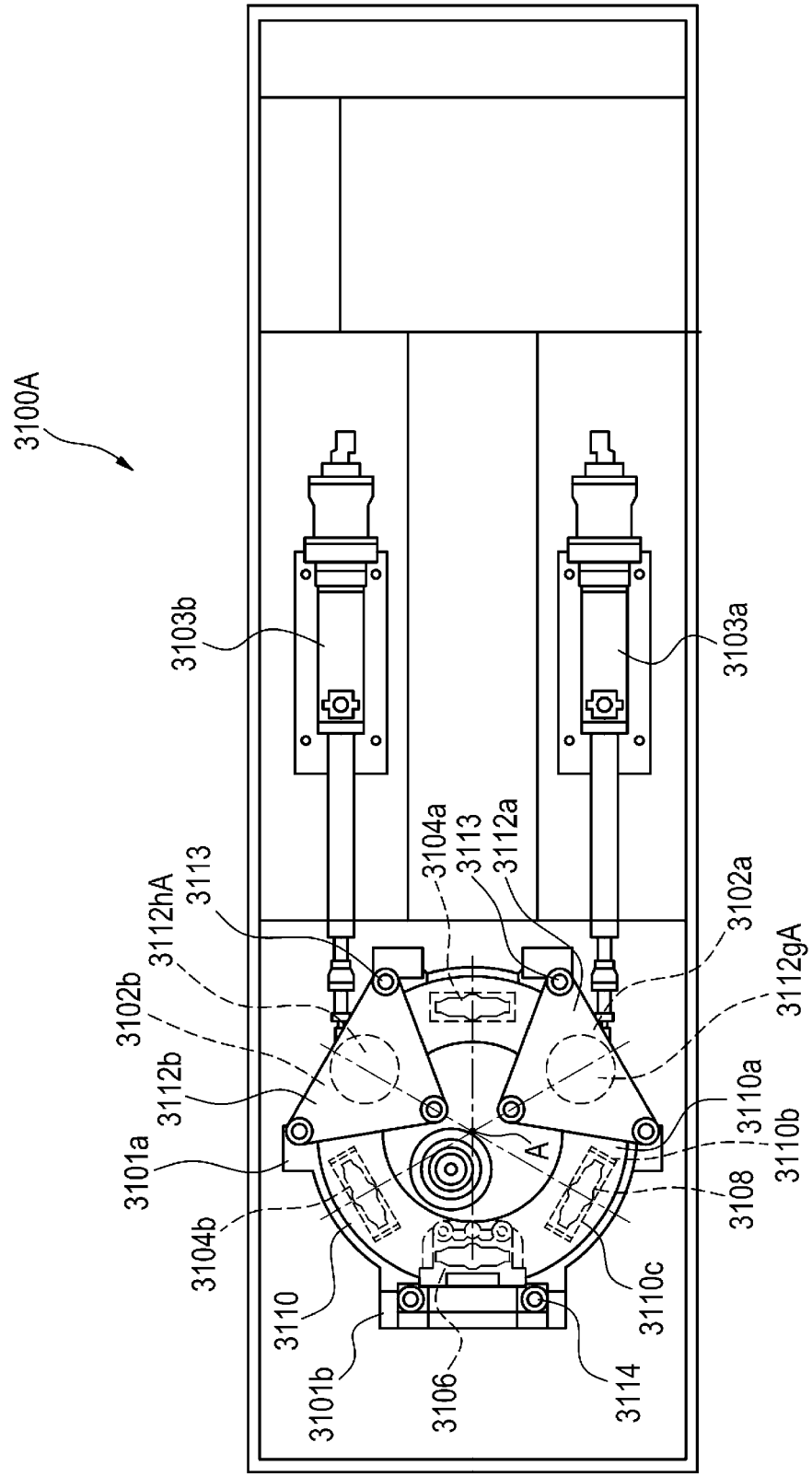
FIG. 10 is a plan view of a manufacturing apparatus according to a modification of the third aspect.
Figure 11:
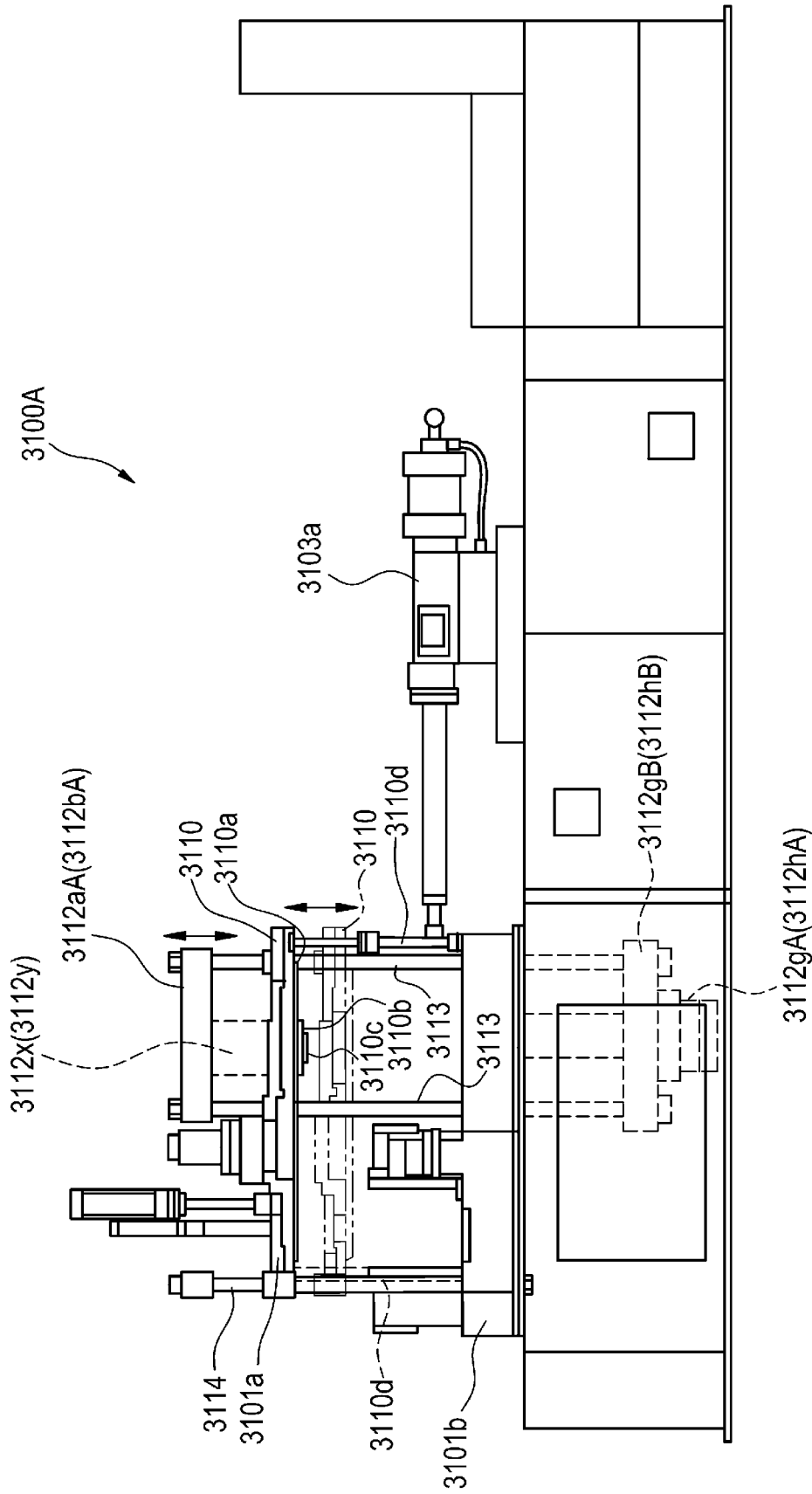
FIG. 11 is a side view of the manufacturing apparatus according to the modification of the third aspect.

Here, a modification of a mode of the mold clamping of the injection molding mold in the manufacturing apparatus 3100 according to the third aspect will be described with reference to FIGS. 10 and 11. FIG. 10 is a plan view of a manufacturing apparatus 3100A according to the modification of the third aspect. FIG. 11 is a side view of the manufacturing apparatus 3100A according to the modification of the third aspect. The manufacturing apparatus 3100A shown in FIGS. 10 and 11 is the same as the manufacturing apparatus 3100 according to the third aspect described above except that a mold clamping mechanism in the injection molding mold is different.

In the manufacturing apparatus 3100A, the first injection molding part 3102*a* and the second injection molding part 3102*b* include a first mold clamping plate 3112*a*A and a second mold clamping plate 3112*b*A which are independently operable. The first mold clamping plate 3112*a*A and the second mold clamping plate 3112*b*A are not provided with members corresponding to the first injection core mold movable plate 3112*c* and the second injection core mold movable plate 3112*d* in the manufacturing apparatus 3100 of the third aspect. A first injection core mold 3112*x* and a second injection core mold 3112*y* are connected to the first mold clamping plate 3112*a*A and the second mold clamping plate 3112*b*A, respectively. In the manufacturing apparatus 3100A, the first mold clamping plate 3112*a* and the second mold clamping plate 3112*b* may be configured to be moved up and down by, for example, a first injection mold clamping cylinder (first injection mold clamping mechanism) 3112*g*A and a second injection mold clamping cylinder (second injection mold clamping mechanism) 3112*h*A provided below the lower base (machine base) 3101*b* to clamp the injection molding mold. The first mold clamping plate 3112*a*A and the second mold clamping plate 3112*b*A are connected to a first pulling plate 3112*g*B and a second pulling plate 3112*h*B below the lower base (machine base) 3101*b* via tie bars 3113. The first injection mold clamping cylinder 3112*g*A and the second injection mold clamping cylinder 3112*h*A are fixed to the first pulling plate 3112*g*B and the second pulling plate 3112*h*B, and rods of the first injection mold clamping cylinder 3112*g*A and the second injection mold clamping cylinder 3112*h*A are connected to the lower surface of the lower base (machine base) 3101*b*. The first injection mold clamping cylinder 3112*g*A and the second injection mold clamping cylinder 3112*h*A may be fixed to the lower surface of the lower base (machine base) 3101*b*, and the rods of the first injection mold clamping cylinder 3112*g*A and the second injection mold clamping cylinder 3112*h*A may be connected to the upper surfaces of the first pulling plate 3112*g*B and the second pulling plate 3112*h*B.

Although the manufacturing apparatuses 1100, 2100, 3100, and 3100A according to the first aspect, the second aspect, the third aspect, and the modification of the third aspect are described, when a two-layer preform or container is manufactured by these manufacturing apparatuses, a mode in which the inner side is the first preform and the outer side is the second preform may be adopted, or a mode in which the outer side is the first preform and the inner side is the second preform may be adopted. In the mode in which the outer side is the first preform and the inner side is the second preform, the outer layer injection mold 50 and the inner layer injection mold 70 described in the above-described embodiment can be adopted.

The presently disclosed subject matter is not limited to the above embodiment and may be modified or improved as appropriate. In addition, materials, shapes, dimensions, numerical values, forms, numbers, arrangement places, and the like of the respective constituent elements in the above-described embodiment are optional and are not limited as long as the presently disclosed subject matter can be achieved.

Note that the present application is based on Japanese Patent Application No. 2019-175844 filed on Sep. 26, 2019, and Japanese Patent Application No. 2020-028040 filed on Feb. 21, 2020, the entire contents of which are incorporated herein by reference. In addition, all references cited here are entirely incorporated.

REFERENCE SIGNS LIST 10 preform
12 opening portion
14 neck portion
16 body portion
18 bottom portion
22 inner layer
24 outer layer
26a recess
26 air introduction hole
27 filling port (opening portion)
28 part
30 delamination container
36 body portion
38 bottom portion
42 inner layer
44 outer layer
50 outer layer injection mold (an example of first injection mold)
52 outer layer cavity mold (an example of first injection cavity mold)
53 hole forming protrusion (an example of first protrusion)
54 outer layer core mold (an example of first injection core mold)
56 neck mold
58 outer layer gate
59 hot runner mold
59a valve pin
60 outer layer preform
61 thin film portion
70 inner layer injection mold (an example of second injection mold)
72 inner layer cavity mold (an example of second injection cavity mold)
73 fitting protrusion (an example of second protrusion)
74 inner layer core mold
78 inner layer gate
79 hot runner mold
80 inner layer preform
100 manufacturing apparatus
102 injection molding part
104 temperature adjustment part
106 blow molding part
108 extraction part
110 conveyance means

The invention claimed is:

1. A manufacturing method for manufacturing a delamination container, the manufacturing method comprising:
    an injection molding process of injection-molding a preform having a two-layer structure including an outer layer and an inner layer; and
    a blow molding process of blow molding the preform to mold the delamination container made of a resin,
    wherein the injection molding process includes:
        an outer layer molding process of molding the outer layer by filling a first injection mold with an outer layer resin material and molding a thin film portion on a thin-film forming part which is a part of the outer layer,
        a thin film portion breaking process of breaking the thin film portion formed in the outer layer molding process, and
        an inner layer molding process of injecting an inner layer resin material from an outside of the thin-film forming part of the outer layer in which the thin film portion is broken in the thin film breaking process, and filling a second injection mold with the inner layer resin material having a temperature lower than a melting point of the outer layer resin material to mold the inner layer,
    wherein the first injection mold includes a first injection cavity mold and a first injection core mold,
    wherein the thin film portion is formed on a bottom portion of the outer layer of the preform, and
    wherein in the outer layer molding process,
        the thin film portion is formed by, after the first injection cavity mold is filled with the outer layer resin material, moving a valve pin of a hot runner mold that supplies the outer layer resin material to the first injection cavity mold toward the first injection core mold and cooling the outer layer resin material for a predetermined time in a state where an outer surface of the thin-film forming part of the outer layer is recessed by a tip portion of the valve pin.

2. The manufacturing method according to claim 1,
wherein after a surface temperature of the outer layer is made equal to or lower than a melting point of the inner layer resin material in the outer layer molding process, the outer layer molding process proceeds to the inner layer molding process.

3. The manufacturing method according to claim 1,
wherein the first injection cavity mold has a first protrusion, and
wherein in the outer layer molding process, a recess for an air introduction hole for delaminating an outer layer and an inner layer of the delamination container is formed in the outer layer by the first protrusion.

4. The manufacturing method according to claim 3,
wherein the second injection mold includes a second injection cavity mold having a second protrusion, and
wherein in the inner layer molding process, the second injection cavity mold is filled with the inner layer resin material in a state where the second protrusion is fitted into the recess for the air introduction hole.

5. A manufacturing method for manufacturing a preform having a two-layer structure including an outer layer and an inner layer by injection molding, the manufacturing method comprising:
    an outer layer molding process of molding the outer layer by filling a first injection mold with an outer layer resin material and molding a thin film portion on a thin-film forming part which is a part of the outer layer, a thin film portion breaking process of breaking the thin film portion formed in the outer layer molding process, and an inner layer molding process of injecting an inner layer resin material from an outside of the thin-film forming part of the outer layer in which the thin film portion is broken in the thin film breaking process, and filling a second injection mold with the inner layer resin material having a temperature lower than a melting point of the outer layer resin material to mold the inner layer, wherein the first injection mold includes a first injection cavity mold and a first injection core mold, wherein the thin film portion is formed on a bottom portion of the outer layer of the preform, and wherein in the outer layer molding process, the thin film portion is formed by, after the first injection cavity mold is filled with the outer layer resin material, moving a valve pin of a hot runner mold that supplies the outer layer resin material to the first injection cavity mold toward the first injection core mold and cooling the outer layer resin material for a predetermined time in a state where an outer surface of the thin-film forming part of the outer layer is recessed by a tip portion of the valve pin.

6. The manufacturing method according to claim 1, wherein a thickness of the thin film portion of the outer layer is thinner than that of a peripheral portion of the outer layer.

7. The manufacturing method according to claim 5, wherein a thickness of the thin film portion of the outer layer is thinner than that of a peripheral portion of the outer layer.

8. The manufacturing method according to claim 1, wherein the thin film portion breaking process comprises injecting the inner layer resin material from the outside of the outer layer toward the thin film portion to break the thin film portion.

9. The manufacturing method according to claim 5, wherein the thin film portion breaking process comprises injecting the inner layer resin material from the outside of the outer layer toward the thin film portion to break the thin film portion.

10. The manufacturing method according to claim 1, further comprising:
a first temperature adjusting process of adjusting a temperature of the outer layer molded in the outer layer molding process; and
a second temperature adjusting process of adjusting a temperature of the inner layer molded in the inner layer molding process.

11. The manufacturing method according to claim 5, further comprising:
a first temperature adjusting process of adjusting a temperature of the outer layer molded in the outer layer molding process; and
a second temperature adjusting process of adjusting a temperature of the inner layer molded in the inner layer molding process.

* * * * *